United States Patent
Ando et al.

(10) Patent No.: US 7,422,621 B2
(45) Date of Patent: Sep. 9, 2008

(54) METHOD FOR CONCENTRATING PRECIOUS METALS CONTAINED IN LEACHING RESIDUE DISCHARGED FROM COPPER HYDROMETALLURGICAL PROCESS

(75) Inventors: Koji Ando, Niihama (JP); Keiji Kudo, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 573 days.

(21) Appl. No.: 10/896,066

(22) Filed: Jul. 22, 2004

(65) Prior Publication Data

US 2005/0022629 A1 Feb. 3, 2005

(30) Foreign Application Priority Data

Jul. 28, 2003 (JP) ............................. 2003-202416

(51) Int. Cl.
*C22B 3/10* (2006.01)
(52) U.S. Cl. ...................................................... 75/426
(58) Field of Classification Search .................. 75/426, 75/744, 416, 631, 421, 425, 430; 423/38, 423/150.3
See application file for complete search history.

(56) References Cited

U.S. PATENT DOCUMENTS

| | | | | |
|---|---|---|---|---|
| 1,588,806 A | * | 6/1926 | Pike et al. | 75/422 |
| 1,634,497 A | * | 7/1927 | Greenawalt | 205/584 |
| 1,943,341 A | * | 1/1934 | Mitchell | 423/109 |
| 4,057,422 A | * | 11/1977 | Swanson | 75/372 |
| 4,067,952 A | * | 1/1978 | Pittie et al. | 423/37 |
| 4,082,629 A | * | 4/1978 | Milner et al. | 205/369 |
| 4,115,221 A | * | 9/1978 | Wadsworth et al. | 205/584 |
| 5,487,819 A | | 1/1996 | Everett | |
| 5,603,750 A | * | 2/1997 | Sierakowski et al. | 75/743 |
| 6,171,564 B1 | | 1/2001 | Jones | |

FOREIGN PATENT DOCUMENTS

CN 1148035 * 4/1997

(Continued)

OTHER PUBLICATIONS

Machine translation of JP 2003-073750.*

(Continued)

*Primary Examiner*—Roy King
*Assistant Examiner*—Tima M McGuthry-Banks
(74) *Attorney, Agent, or Firm*—Edwards Angell Palmer & Dodge LLP

(57) ABSTRACT

A method for concentrating precious metals contained in the leaching residue discharged from a copper hydrometallurgical process by removing pyrite from the residue. A method for concentrating precious metals in the leaching residue containing pyrite, elementary sulfur, precious metals and gangue, discharged from a copper hydrometallurgical process which comprises steps of leaching in an acidic, aqueous solution, reducing the copper-containing leaching liquor and electrolysis for copper recovery to treat copper sulfide ores, comprising (1) pyrolysis step in which the leaching residue is thermally treated at 550.degree. C. or higher in a non-oxidative atmosphere, to produce the calcined ore containing pyrrhotite, precious metals and gangue, and (2) a re-leaching step in which the calcined ore is re-leached in an acidic, aqueous solution, to be separated into the re-leaching residue and iron-leached liquor, the former containing elementary sulfur, precious metals and gangue.

11 Claims, 2 Drawing Sheets

FOREIGN PATENT DOCUMENTS

| | | | |
|---|---|---|---|
| JP | 2003-73750 | * | 3/2003 |
| WO | WO 94/00606 A1 | | 1/1994 |
| WO | WO 99/09225 A1 | | 2/1999 |

OTHER PUBLICATIONS

English abstract of CN 1148035.*

Berg et al. "Characteristic Features of Sulphide Mineral Data", Journal of Thermal Analysis, vol. 8 (1975), pp. 417-426.*

Lambert et al. "The Kinetics and Mechanism of Pyrite-to-Pyrrhotite Transformation", Metallurgical and Materials Transactions B, vol. 29B, Apr. 1998, pp. 385-396.*

Lu et al. "The effect of chloride ions on the dissolution of chalcopyrite in acidic solutions", Hydormetallurgy 56 (2000) 189-202.*

Patent Abstracts of Japan, Publication No. 2000-313924, dated Nov. 14, 2000./Discussed in the specification.

* cited by examiner

METHOD FOR CONCENTRATING PRECIOUS METALS CONTAINED IN LEACHING RESIDUE DISCHARGED FROM COPPER HYDROMETALLURGICAL PROCESS

BACKGROUND OF THE INVENTION

1. Field of the Invention

The present invention relates to a method for concentrating precious metals contained in the leaching residue discharged from a copper hydrometallurgical process, more particularly method for concentrating precious metals by removing pyrite contained in the leaching residue. The method of the present invention for concentrating precious metals is used to treat leaching residue discharged from a copper hydrometallurgical process which recovers copper from copper sulfide ores.

2. Description of the Prior Art

At present, copper is produced worldwide mostly by dry smelting processes which treat a copper sulfide concentrate as the starting material. The copper sulfide concentrate is a concentrate of sulfide mineral produced from a ore containing sulfide mineral e.g., chalcopyrite ($CuFeS_2$), by a physical separation process, e.g., ore floatation. It includes the copper minerals described above, iron sulfide minerals, e.g., pyrite ($FeS_2$) and pyrrhotite ($Fe_{1-x}S$: x=0 to 0.2), and oxide minerals, e.g., silicate mineral as gangue, although its composition mainly depends on the mine. It also includes zinc, lead, Group 15 metals, e.g., arsenic, antimony and bismuth, Group 16 metals, e.g., selenium and tellurium, and precious metals, mainly present in sulfide minerals.

The copper dry smelting processes are suitable for efficiently treating large quantities of ores. However, they involve disadvantages, e.g., large-size facilities and hence high investment costs are required in consideration of low reaction efficiency by small-size facilities, and recovery of massively produced $SO_2$ gas is essential. Under these situations, the hydrometallurgical processes have been recently studied.

One of the copper hydrometallurgical processes widely adopted on a commercial scale comprises steps of spraying sulfuric acid onto a heaped copper ore containing a copper oxide mineral to leach out copper, treating the leaching liquor by solvent extraction to increase its copper concentration, and electrolysis for copper recovery. This process, however, involves a disadvantage of low productivity, when applied to sulfide ores, which accounts for majority of copper ores, because chalcopyrite, present in the ores at a higher content than other minerals, is leached with sulfuric acid slowly, resulting in low leaching yield. Therefore, it is difficult for this process to realize productivity comparable to that of a dry smelting process.

In order to solve this disadvantage, methods have been proposed to leach chalcopyrite under conditions favorable for its leaching. One of the representative processes comprises steps of oxidizing a copper ore or copper concentrate under pressure in a halide-containing acidic solution of sulfate ion, leaching the resultant oxide, solvent extraction of the cupric ion present in the leaching liquor, and electrolysis for copper recovery (disclosed by, e.g., Patent Document 1). Another process comprises a step of leaching a copper concentrate with a leaching solution (e.g., chlorine bromide ion) capable of forming a halide complex, which is followed by electrolysis for recovering the cuprous ion produced by the leaching at a low oxidation-reduction potential (disclosed by, e.g., Patent Document 2).

The hydrometallurgical process has several advantages over the dry smelting process. For example, it needs a reduced facility size and hence facility investment resulting from lower operating temperature, and provides wider flexibility of production schedules, because it can be shut down in shorter cycles. However, the hydrometallurgical process also has major problems to be solved, e.g., leaching rate to be improved with chalcopyrite, recovery of precious metals, and abatement of waste residue.

For recovery of precious metals, their separation may be difficult when a leaching solution for the hydrometallurgical process is excessively oxidative, because most elements present in the starting material may be oxidized and leached out. Precious metals present in trace quantities, e.g., gold and silver, are present generally at a very low content in the leaching liquor into which they are leached.

Several methods for recovering these precious metals have been proposed, e.g., by adsorption on active carbon and in the form of amalgam (disclosed by, e.g., Patent Document 2). However, they are frequently not advantageous over the dry smelting process, depending on cost associated with active carbon or agent, and effects on environments.

Therefore, precious metals have been concentrated in the leaching residue, which is treated by a traditional smelting route for copper concentrate, in an existing smelting plant, or by a melting furnace for industrial waste disposal containing copper and so on, where it works as a sulfur source (disclosed by, e.g., Patent Document 3). However, these methods are far from optimum with respect to efficiency, because of increased quantities of pyrite, which press the dry step capacity, increased sulfuric acid production cost resulting from sulfur present in the pyrite, increased iron to be disposed as slag, and so on.

Moreover, the leaching residue contains pyrite, precious metals and gangue, in addition to elementary sulfur, and is frequently less stable chemically than slag discharged from a dry smelting process. Therefore, an adequate countermeasure against impurities of the leaching residue is essential. It is preferable to cut down waste residue by enhancing leaching rate of iron, which is the major ingredient of the residue, in the leaching step and treat pyrite present at a high concentration as the countermeasures.

With a copper concentrate as the starting material, however, pyrite accounting for a large share of the resulting residue is not only in itself sparingly soluble in an acid but also difficult to leach while accelerating leaching a coexisting copper sulfide mineral. Precious metals, e.g., gold, are present in a copper concentrate at a very low concentration and distributed in copper and pyrites. Therefore, disposal of pyrite without recovering the precious metals will lead to a major economic loss. It should be noted, however, that complete leaching of pyrite needs a high oxidative power, which causes major process problems, e.g., oxidation of sulfur and leaching of precious metals.

Therefore, the leaching step adopts the conditions under which pyrite is distributed in the leaching residue, in order to control oxidation of precious metals and sulfur. As a result, the leaching residue builds up, when an ore containing pyrite at a high concentration is treated, and precious metals are not concentrated sufficiently.

Under these circumstances, there have been demands for hydrometallurgical processes capable of efficiently treating copper sulfide ores by realizing a method for removing pyrite present in the leaching residue therefrom and concentrating precious metals in the residue.

[Patent Document 1]
JP-A-2001-515145 (pages 1 and 2)
[Patent Document 21]
Japanese Patent No. 2,857,930 (pages 1 to 4)
[Patent Document 3]
JP-A-2000-313924 (pages 1 and 2)

SUMMARY OF THE INVENTION

It is an object of the present invention to provide a method for concentrating precious metals in the leaching residue discharged from a copper hydrometallurgical process by removing pyrite contained in the leaching residue, in consideration of the above-described problems involved in the conventional techniques.

The inventors of the present invention have found, after having extensively studied methods for concentrating precious metals in the leaching residue discharged from a copper hydrometallurgical process for treating copper sulfide ores, which contains pyrite, elementary sulfur, precious metals and gangue, to achieve the above object, that pyrite can be removed and precious metals can be concentrated when the leaching residue is thermally treated under specific conditions and the resulting calcined ore or magnetic fraction is re-leached under specific conditions, achieving the present invention.

The first aspect of the present invention is a method for concentrating precious metals in the leaching residue containing pyrite, elementary sulfur, precious metals and gangue, discharged from a copper hydrometallurgical process which comprises steps of leaching in an acidic, aqueous solution, reducing the copper-containing leaching liquor and electrolysis for copper recovery to treat copper sulfide ores, comprising:
(1) a pyrolysis step in which the leaching residue is thermally treated at 550° C. or higher in a non-oxidative atmosphere, to produce the calcined ore containing pyrrhotite, precious metals and gangue, and
(2) a re-leaching step in which the calcined ore is re-leached in an acidic, aqueous solution, to be separated into the re-leaching residue and iron-leached liquor, the former containing elementary sulfur, precious metals and gangue.

The second aspect of the present invention is a method for concentrating precious metals in the leaching residue containing pyrite, elementary sulfur, precious metals and gangue, discharged from a copper hydrometallurgical process which comprises steps of leaching in an acidic, aqueous solution, reducing the copper-containing leaching liquor and electrolysis for copper recovery to treat copper sulfide ores, comprising:
(1) a pyrolysis step in which the leaching residue is thermally treated at 550 to 750° C. in a non-oxidative atmosphere, to produce the calcined ore containing pyrrhotite, precious metals and gangue,
(2) a magnetic separation step in which the calcined ore is separated into the non-magnetic fraction and magnetic fraction, the former containing precious metals and gangue and the latter containing pyrrhotite and precious metals, and
(3) a re-leaching step in which the magnetic fraction is re-leached in an acidic, aqueous solution, to be separated into the re-leaching residue and iron-leached liquor, the former containing elementary sulfur, precious metals and gangue.

The third aspect of the present invention is the method of the first aspect for concentrating precious metals, wherein the leaching residue to be treated by the pyrolysis step contains silicic acid at 5% by weight or more.

The fourth aspect of the present invention is the method of the first aspect for concentrating precious metals, wherein the acidic, aqueous solution for the re-leaching step is the copper-containing leaching liquor discharged from the leaching step with an acidic, aqueous, chloride-based solution for the copper hydrometallurgical process.

The fifth aspect of the present invention is the method of the first aspect for concentrating precious metals, wherein the acidic, aqueous solution for the re-leaching step is adjusted beforehand at an oxidation-reduction potential of 600 mV or less (determined using a silver/silver chloride reference electrode).

The sixth aspect of the present invention is the method of the first aspect for concentrating precious metals, wherein the leaching residue discharged from the re-leaching step is distilled at 200 to 350° C. to distill off the elementary sulfur.

The seventh aspect of the present invention is the method of the first aspect for concentrating precious metals, wherein a sulfur-distillation step for treating the leaching residue at 150 to 500° C. is incorporated prior to the pyrolysis step to distill off the elementary sulfur beforehand.

The eighth aspect of the present invention is the method of the second aspect for concentrating precious metals, wherein the leaching residue to be treated by the pyrolysis step contains silicic acid at 5% by weight or more.

The ninth aspect of the present invention is the method of the second aspect for concentrating precious metals, wherein the acidic, aqueous solution for the re-leaching step is the copper-containing leaching liquor discharged from the leaching step with an acidic, aqueous, chloride-based solution for the copper hydrometallurgical process.

The tenth aspect of the present invention is the method of the second aspect for concentrating precious metals, wherein the acidic, aqueous solution for the re-leaching step is adjusted beforehand at an oxidation-reduction potential of 600 mV or less (determined using a silver/silver chloride reference electrode).

The $11^{th}$ aspect of the present invention is the method of the second aspect for concentrating precious metals, wherein the residue discharged from the re-leaching step is distilled at 200 to 350° C. to distill off the elementary sulfur.

The $12^{th}$ aspect of the present invention is the method of the second aspect for concentrating precious metals, wherein a sulfur-distillation step for treating the leaching residue at 150 to 500° C. is incorporated prior to the pyrolysis step to distill off the elementary sulfur beforehand.

The $13^{th}$ aspect of the present invention is the method of the $12^{th}$ aspect for concentrating precious metals, wherein the re-leaching residue discharged from the re-leaching step is recycled back to the sulfur-distillation step.

NOTATION

Figure 1:
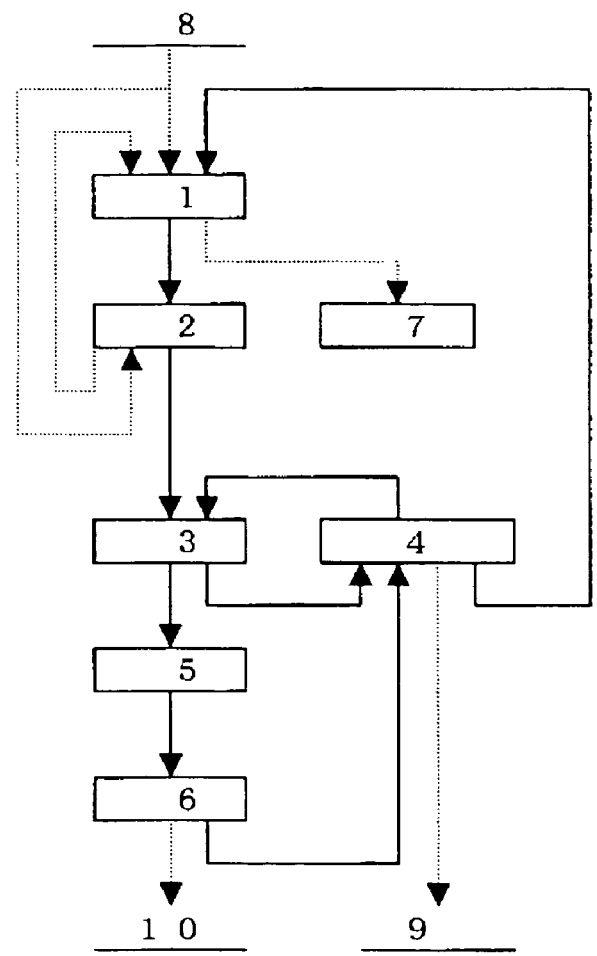
FIG. 1 illustrates one example of copper hydrometallurgical process scheme.

1 Chlorine leaching step
2 Copper ion reduction step
3 Solvent extraction step
4 Electrolysis step for copper recovery
5 Purification step
6 Electrolysis step for iron recovery
7 Leaching residue treating step
8 Copper sulfide ore
9 Electrodeposited copper
10 Electrodeposited iron
11 Pyrolysis step
12 Re-leaching step
13 Magnetic separation step
14 Sulfur distillation step
15 Leaching residue
16 Magnetic fraction
17 Non-magnetic fraction
18 Re-leaching residue
19 Iron-leached liquor

DETAILED DESCRIPTION OF THE INVENTION

The method of the present invention for concentrating precious metals contained in the leaching residue discharged from a copper hydrometallurgical process is described in detail. The present invention provides a method for concentrating precious metals in the leaching residue containing pyrite, elementary sulfur, precious metals and gangue, discharged from a copper hydrometallurgical process which comprises steps of leaching in an acidic, aqueous solution, reducing the copper-containing leaching liquor and electrolysis for copper recovery to treat copper sulfide ores.

First, the method of the present invention for concentrating precious metals contained in the leaching residue discharged from a copper hydrometallurgical process is outlined by referring to the drawings. Each of FIGS. 2 and 3 illustrates the flow diagram of the method for concentrating precious metals.

Figure 2:
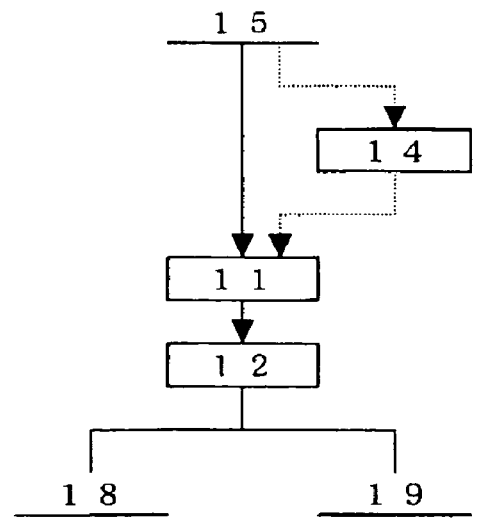
FIG. 2 illustrates one example of the process scheme of the method of the present invention for concentrating precious metals.

Referring to FIG. 2, the leaching residue 15 is treated first by the pyrolysis step 11, in which it is thermally treated at 550° C. or higher in a non-oxidative atmosphere, to produce the calcined ore containing pyrrhotite, precious metals and gangue. Then, the calcined ore is treated in the re-leaching step 12, in which it is re-leached in an acidic, aqueous solution, to be separated into the re-leaching residue 18 and iron-leached liquor 19, the former containing elementary sulfur, precious metals and gangue. The leaching residue 15 may be treated by the sulfur-distillation step 14, prior to the pyrolysis step 11, to separate elementary sulfur beforehand.

Figure 3:
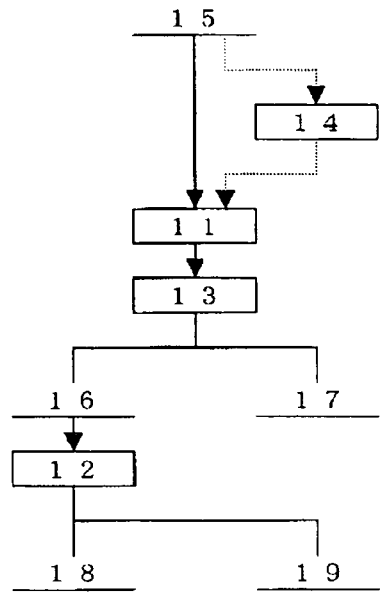
FIG. 3 illustrates one example of the process scheme of the method of the present invention for concentrating precious metals.

Referring to FIG. 3, the leaching residue 15 is treated first by the pyrolysis step 11, in which it is thermally treated at 550 to 750° C. in a non-oxidative atmosphere, to produce the calcined ore containing pyrrhotite, precious metals and gangue. Next, the calcined ore is treated by the magnetic separation step 13, where it is separated into the non-magnetic fraction 17 and magnetic fraction 16, the former containing precious metals and gangue and the latter pyrrhotite and precious metals. The magnetic fraction 16 is then treated in the re-leaching step 12, in which it is re-leached in an acidic, aqueous solution, to be separated into the re-leaching residue 18 and iron-leached liquor 19, the former containing elementary sulfur, precious metals and gangue. The leaching residue 15 may be treated by the sulfur-distillation step 14, prior to the pyrolysis step 11, to separate elementary sulfur beforehand.

1. Leaching Residue Discharged from a Copper Hydrometallurgical Process

The leaching residue as the starting material for the present invention is discharged from a copper hydrometallurgical process which comprises steps of leaching in an acidic, aqueous solution, reducing the copper-containing leaching liquor and electrolysis for copper recovery to treat copper sulfide ores, and contains pyrite, elementary sulfur, precious metals and gangue. The precious metals include the platinum group metals, in addition to gold and silver.

The copper hydrometallurgical process is outlined by referring to FIG. 1, which illustrates one example of the process scheme.

Referring to FIG. 1, the copper sulfide ore 8 is first treated by the chlorine leaching step 1, where it is separated into the leaching liquor and residue, the former containing copper, iron or the like and the latter pyrite, elementary sulfur, precious metals and gangue. The leaching liquor is treated by the copper ion reduction step 2, where the copper ion in the liquor is reduced into the cuprous ion. When a starting copper material containing a copper sulfide ore is used as the reductant in this step, the residue is recycled back to the leaching step. The reduced liquor is treated by the solvent extraction step 3, where it is separated by the solvent extraction and stripping into the strip liquor containing the copper ion and raffinate, the former being treated by the electrolysis step 4 to recover copper as the electrodeposited copper 9, while the latter being treated, as required, by the purification step 5 to be separated into the refined solution containing iron ion and solids containing valuable metals other than iron. The refined solution containing iron ion is treated by the electrolysis step for iron recovery 6 to recover iron as the electrodeposited iron 10. The residue separated by the chlorine leaching step 1 is treated by the leaching residue treating step 7.

The residue discharged from the leaching step generally contains pyrite, elementary sulfur, precious metals and gangue, although its composition varies depending on the mineral composition of the starting ore. It also contains small quantities of concomitant valuable materials, e.g., sulfide minerals. Elementary sulfur is produced when copper sulfide minerals, e.g., chalcopyrite, are leached. In other words, copper hydrometallurgical processes in general select operating conditions under which elementary sulfur is produced while sulfur oxidation is controlled for economic reasons. Pyrite is originally present in a copper sulfide ore together with oxide minerals, e.g., silicate mineral as gangue. It is little leached by the leaching step under operating conditions described above and left in the leaching residue together with precious metals and gangue.

The leaching step for treating a copper sulfide ore and the resultant leaching residue are described in detail. It was evaluated for its composition, where a copper concentrate was used as the copper sulfide ore. The chemical composition and mineral species of the copper concentrate are given in Tables 1 and 2.

TABLE 1

| Chemical composition (% by weight) | | | | Content (g/t) | |
|---|---|---|---|---|---|
| Cu | Fe | S | $SiO_2$ | Au | Ag |
| 27.9 | 26.0 | 30.5 | 5.1 | 9 | 95 |

TABLE 2

| Mineral species (%) | | | |
|---|---|---|---|
| Chalcocite | Chalcopyrite | Pyrite | $SiO_2$ and others |
| <0.1 | 85.7 | 4.1 | 10.2 |

A 500 mL reactor of titanium was charged with 30 g of the copper concentrate described above and 300 mL of an acidic, chloride-based leaching solution (copper concentration: 60 g/L, chloride ion concentration: 200 g/L), and put in an oil bath to keep the slurry at 105 to 110° C., into which a chlorine gas was blown for 3 hours for leaching at a constant oxidation-reduction potential of 520 mV (determined using a silver/silver chloride reference electrode). Then, the slurry was separated by filtration into the leaching residue and leaching liquor. The residue weighed 15 g. It was analyzed for the chemical composition and mineral species. The results are given in Table 3.

TABLE 3

| | Chemical composition (% by weight) | | | | Content (g/t) |
|---|---|---|---|---|---|
| | Cu | Fe | S | $SiO_2$ | Au |
| Leaching residue | 0.7 | 9.9 | 53.3 | 21.9 | 30 |

The leaching residue was mainly composed of elementary sulfur, pyrite ($FeS_2$) and gangue of silica ($SiO_2$) or the like, as revealed by X-ray diffractometry and optical microscopy. It was also observed that gold having a size of 10 μm or more in size, discernable by optical microscopy, was present in the elementary state. The leaching residue was non-magnetic, showing no reaction with a magnet.

It was therefore found that the residue from the chlorine leaching of the copper concentrate in the acidic, aqueous, chloride-based solution contained elementary sulfur, pyrite, silica and precious metals, where sulfur accounted for around 50% by weight.

The leaching step was carried out using an acidic, aqueous, chloride-based solution. However, the acidic, aqueous solution for the copper hydrometallurgical process is not limited to the above, and may be an acidic, aqueous solution containing the chloride and/or sulfate ion.

2. Pyrolysis Step

The pyrolysis step for the present invention thermally treats the leaching residue at 550° C. or higher in a non-oxidative atmosphere, to produce the calcined ore containing pyrrhotite formed by the pyrolysis, precious metals and gangue.

It is important in the above step to thermally treat the leaching residue in a non-oxidative atmosphere, preferably in a neutral or sulfur gas atmosphere, because the calcined ore produced can be easily treated by the acid leaching to elute iron. The pyrolysis step, when carried out in an oxidative atmosphere, oxidizes elementary sulfur and pyrite, the resulting iron oxide being difficult to dissolve in an acid.

When a re-leaching step is adopted subsequent to the pyrolysis step, it is of significance to carry out the step under heating at 550° C. or higher, preferably 600 to 900° C. The treatment at 550° C. or higher in a non-oxidative atmosphere pyrolyzes pyrite in the leaching residue, transforming it into pyrrhotite while releasing sulfur. The pyrrhotite can be eluted out in an acidic, aqueous solution containing the chloride and/or sulfate ion. At below 550° C., the mineral transformation from pyrite into pyrrhotite by pyrolysis is insufficient. On the other hand, little effect will be produced by increasing temperature beyond 900° C.

When a magnetic separation step is adopted subsequent to the pyrolysis step, it is of significance to carry out the step under heating at 550 to 750° C., preferably 600 to 700° C. At above 750° C., pyrrhotite showing magnetism may be no longer produced.

Silicic acid concentration of the leaching residue for the above step is not limited, but preferably adjusted at 5% by weight or more, at which the calcined ore can be recovered in the powdery state without being fused when treated at the above temperature. At below 5% by weight, the residue tends to be fused when treated at 620° C. or higher, i.e., lower than melting point of pyrite (about 650° C.), and should be crushed for the subsequent step.

The mineral transformation occurring in the thermally treated leaching residue in the pyrolysis is described more specifically. The leaching residue having the chemical composition given in Table 3 was thermally treated, and the resultant calcined ore was evaluated. The leaching residue (60 g) put in a quartz boat was heated in a tubular furnace in a nitrogen atmosphere to a specified temperature (440 to 900° C.), at which it was held for 3.5 hours for heat treatment. The resulting calcined ore was evaluated for the chemical composition, mineral transformation and magnetism, after it was cooled. The results of mineral transformation, determined by X-ray diffractometry, and magnetism are given in Table 4, and chemical composition of the calcine ore in Table 5. The thermal analysis results indicate that the mineral transformation caused by the pyrolysis tarts at 550° C., judging from its weight loss.

TABLE 4

| | Pyrolysis temperature (° C.) | | | | |
|---|---|---|---|---|---|
| | 440 | 600 | 700 | 800 | 900 |
| Magnetism | Not observed | Observed | Observed | Not observed | Not observed |
| Mineral species of iron sulfide | Pyrite ($FeS_2$) | Pyrrhotite (FeS) | Pyrrhotite (FeS) | Pyrrhotite (FeS) | Pyrrhotite (FeS) |

TABLE 5

| Treatment temperature (°C.) | Chemical composition (% by weight) | | | | Content (g/t) |
|---|---|---|---|---|---|
| | Cu | Fe | S | SiO$_2$ | Au |
| 440 | 0.9 | 19.7 | 21.1 | 37.7 | 81 |
| 600 | 1.4 | 20.4 | 14.0 | 39.2 | 88 |
| 700 | 0.9 | 20.0 | 11.6 | 40.0 | 80 |
| 800 | 1.5 | 21.5 | 13.9 | 41.7 | 76 |
| 900 | 0.8 | 19.3 | 12.9 | 36.3 | 70 |

As shown in Table 4, pyrite is transformed into pyrrhotite, when treated at 600° C. or higher. It is also shown that the pyrrhotite has magnetism, when formed at 600 and 700° C.

As shown in Table 5, the leaching residue significantly loses sulfur, when thermally treated at 440° C. or higher, by which is meant that elementary sulfur in the leaching residue and that resulting from pyrolysis of pyrite are distilled off. It is also shown that precious metals are concentrated in the calcined ore, judging from the Au concentration.

As discussed above, the pyrolysis step carried out under the specific heating conditions produces the calcine ore containing pyrrhotite having magnetism and highly soluble in an acid, while allowing elementary sulfur to be distilled off.

3. Magnetic Treatment

The magnetic separation step for the present invention magnetically separates the calcined ore into the non-magnetic fraction and magnetic fraction, the former containing precious metals and gangue and the latter pyrrhotite and precious metals.

The calcined ore to be treated in this step is from the leaching residue thermally treated at 550 to 750° C. in a non-oxidative atmosphere, and contains pyrrhotite formed by the pyrolysis, precious metals and gangue.

In this step, pyrrhotite in the calcined ore is separated in the magnetic fraction, where Au present in pyrrhotite (Au particles and Au dissolved in pyrrhotite) is distributed in the magnetic fraction. On the other hand, the gangue having a lower magnetism and independent Au particles are distributed in the non-magnetic fraction. Therefore, pyrrhotite can be effectively separated from gangue, e.g., silica, but concentration of Au is not highly expected.

The magnetic separation method for this step is not limited, and can be carried out by a commercial magnetic separator, where a common electromagnet or rod-shaped magnet is brought into contact with the calcined ore or its slurry. When the calcined ore is slurried, ultrasonic treatment prior to or during the magnetic separation step can improve efficiency of separation of the magnetic fraction from the non-magnetic fraction.

Distribution of each component of the calcined ore by the magnetic separation step is described more specifically. The calcined ore produced by the pyrolysis step carried out at 600° C. was treated by the magnetic separation step, and the resulting non-magnetic and magnetic fractions were evaluated. The results are given in Table 6.

TABLE 6

| | Distribution (% by weight) | Chemical composition (% by weight) | | | | Content (g/t) |
|---|---|---|---|---|---|---|
| | | Cu | Fe | S | SiO$_2$ | Au |
| Magnetic fraction | 40 | 1.4(38) | 53.5(93) | 35.5(91) | 6.4(6) | 73(42) |
| Non-magnetic fraction | 60 | 1.5(62) | 2.6(7) | 2.3(9) | 63.5(94) | 68(58) |
| Total | 100 | 1.46(100) | 22.8(100) | 15.5(100) | 40.8(100) | 70(100) |

*Distribution rate (%) is given in the parentheses.

As shown in Table 6, iron is mostly distributed in the magnetic fraction and SiO$_2$ in the non-magnetic fraction, indicating that iron and gangue can be efficiently separated from each other by the magnetic separation step, and that Au is almost evenly distributed in these fractions.

As discussed above, pyrrhotite is separated by this step, and iron can be separated by the subsequent re-leaching step which treats the magnetic fraction. Therefore, this step is effective, when gangue is present at a high content in the calcined ore, or leaching residue.

4. Re-Leaching Step for the Calcined Ore and Magnetic Fraction

The calcined ore re-leaching step for the present invention separates the calcined ore in an acidic, aqueous solution into the re-leaching residue and iron-leached liquor, the former containing elementary sulfur, precious metals and gangue.

The magnetic fraction re-leaching step for the present invention separates the magnetic fraction in an acidic, aqueous solution into the re-leaching residue and iron-leached liquor, the former containing elementary sulfur, precious metals and gangue. This step is intended to improve leaching efficiency and reduce the facility size by treating the magnetic fraction having magnetism after it is separated by an adequate means, e.g., magnetic separation, from non-magnetic gangue and precious metals. The re-leaching residue discharged from this step may be sent to an outside recovery step without being treated, or it may be recycled back to the sulfur-distillation step to be treated by the pyrolysis and magnetic separation steps repeatedly to further enhance concentration degree of the non-magnetic fraction together with gangue, before being sent to an outside step.

These re-leaching steps can be operated under basically similar conditions, because the feed streams are compositionally not much different from each other, although the magnetic fraction re-leaching step treats the fraction from which gangue is mostly removed.

Oxidation-reduction potential (determined using a silver/silver chloride reference electrode) of the acidic, aqueous solution for these steps is not limited, but preferably adjusted beforehand at 600 mV or less, more preferably 520 mV or less. The potential above 600 mV is not desirable, because sulfur and gold in the calcined ore or magnetic fraction are leached out together with pyrrhotite at such a high potential.

The acidic, aqueous solution for these steps is not limited, and an acidic, aqueous solution containing the chloride and/or sulfate ion may be used. The preferable solution is the leaching liquor discharged from the leaching step with an acidic, aqueous, chloride-based solution for the copper hydrometallurgical process. The leaching liquor can leach pyrrhotite from the calcined ore or magnetic fraction, and, at the same time, works as a reductant to reduce the cupric ion in the liquor. Reduction of the cupric ion into the cuprous ion is essential for the copper hydrometallurgical process, because it allows electrolysis of monovalent copper, which halves power consumption for copper recovery. At the same time, sulfur in pyrrhotite is recovered as elementary sulfur, accompanied by neither production of toxic hydrogen sulfide gas nor oxidation of sulfur.

The method for separating elementary sulfur newly produced in these re-leaching steps is not limited. However, it is preferable that the re-leaching residue is distilled at 200 to 350° C. to distill off elementary sulfur. Distillation at a temperature in the above range recovers elementary sulfur and forms a sulfur atmosphere to prevent oxidation of the re-leaching residue.

Distribution of each component of the magnetic fraction by the re-leaching step is described more specifically. The magnetic fraction (refer to Table 6 for its chemical composition) produced by the magnetic separation step was treated by re-leaching using an aqueous cupric chloride solution (copper concentration: 10 g/L) or 1.2 mols/L hydrochloric acid, and sulfur leaching rate was determined. The magnetic fraction (10 g) was stirred in 1.5 L of the aqueous cupric chloride solution at 70° C. for 7 hours, and the resulting leaching residue was separated by filtration to be analyzed. The results are given in Table 7. In the other run, 20 g of the magnetic fraction was stirred in 400 mL of the hydrochloric acid at 70° C. for 7 hours, and the resulting leaching residue was separated by filtration to be analyzed. The results are given in Table 8.

TABLE 7

| | Weight (g) | Chemical composition (% by weight) | | | Content (g/t) |
|---|---|---|---|---|---|
| | | Cu | Fe | S | Au |
| Magnetic fraction | 10 | 1.4 | 20.4 | 14.0 | 75 |
| Re-leaching residue | 6 | 0.6 | 1.5 | 61.1 | 141 |
| Leaching rate (%) | | 71 | 98 | 1.5 | 0 |

TABLE 8

| | Weight (g) | Chemical composition (% by weight) | | | | Content (g/t) |
|---|---|---|---|---|---|---|
| | | Cu | Fe | S | SiO$_2$ | Au |
| Magnetic fraction | 20 | 0.5 | 20.0 | 13.3 | 38.9 | 75 |
| Re-leaching residue | 14 | 0.7 | 9.6 | 7.9 | 56.1 | 104 |
| Leaching rate (%) | | 0 | 66 | 48 | 2 | 0 |

It is found, as shown in Table 7, that most of iron is leached out, sulfur and gold are concentrated in the re-leaching residue, and oxidation rate of sulfur in the magnetic fraction is low at 1.5%. It is also found, as shown in Table 8, that sulfur oxidation rate reaches as high as 48%, although gold is concentrated to some extent. In other words, the re-leaching with an acidic, aqueous, chloride-based solution containing the copper ion also brings an effect of controlling oxidation of sulfur.

Figure 4:
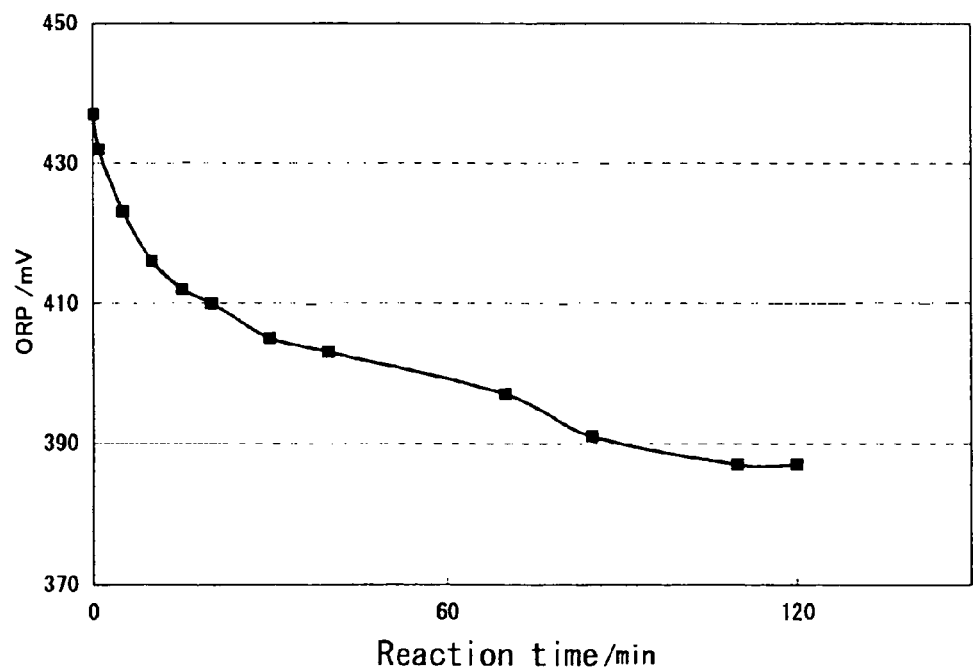
FIG. 4 shows oxidation-reduction potential (ORP) changing with reaction time in the re-leaching step for the present invention.

Next, changed oxidation-reduction potential during the re-leaching step is described more specifically. The magnetic fraction (refer to Table 6 for its chemical composition) produced by the magnetic separation step was treated by re-leaching using the acidic, aqueous, chloride-based solution containing the cupric ion, to observe oxidation-reduction potential (ORP, determined using a silver/silver chloride reference electrode) of the solution. The results are given in FIG. 4. As shown in FIG. 4, the ORP (determined using a silver/silver chloride reference electrode) level is decreased from the initial level of 440 mV to 390 mV, by which is meant that copper in the acidic, aqueous, chloride-based solution (leaching liquor) is mostly reduced into the cuprous ion. In other words, pyrrhotite in the magnetic fraction efficiently works as a reductant to reduce the cupric ion while being eluted out.

As discussed above, the re-leaching step elutes out iron from the calcined ore produced by the pyrolysis step or magnetic fraction produced by the magnetic separation step, and produces the residue in which precious metals are concentrated.

5. Sulfur Distillation Step

The sulfur distillation step for the present invention is not limited. It is adopted prior to the pyrolysis step, to distill off elementary sulfur beforehand from the leaching residue by distillation effected at 150 to 500° C., to make the facilities operating at high temperature compacter. The distillation temperature is selected from a range of 150 to 500° C., i.e., melting point of sulfur or higher but its thermal decomposition temperature or lower. The distillation is carried out preferably at 200 to 350° C., at which elementary sulfur is efficiently distilled off and, at the same time, oxidation of the re-leaching residue can be prevented by virtue of the sulfur gas atmosphere produced in the system.

Next, each component distributed by the sulfur distillation step is described more specifically. The leaching residue (refer to Table 3 for its chemical composition) produced by the step was distillated, and the residue was evaluated. The quartz boat carrying 150 g of the leaching residue was heated in a tubular furnace in a nitrogen atmosphere at 320° C., and sulfur was cooled with a air cooling tube provided at the outflowing gas end to be separated out. It was heated for 4 hours, and then cooled in a flow of gas to 70° C. or lower. Then, the residue and sulfur were taken out of the furnace. The residue analysis results are given in Table 9.

TABLE 9

|  | Chemical composition (% by weight) | | | | Content (g/t) |
| --- | --- | --- | --- | --- | --- |
|  | Cu | Fe | S | SiO$_2$ | Au |
| Leaching residue | 0.7 | 9.9 | 53.3 | 21.9 | 30 |
| Sulfur distillation residue | 0.8 | 5.7 | 3.8 | 57.7 | 120 |

As shown in Table 9, the sulfur distillation step distilled off sulfur to concentrate gold.

As discussed above, the re-leaching residue, before and after being treated by the sulfur distillation step, and non-magnetic fraction produced by the method of the present invention are free of pyrite. As a result, they can be treated at a reduced cost, even when treated by a precious metal treating step in an existing smelting plant, because they cause production of additional sulfuric acid to a limited extent and no iron treatment load. Moreover, they can be efficiently treated, because valuable materials, e.g., trace quantities of platinum group elements in addition to gold, are highly concentrated in the leaching residue.

EXAMPLES

The present invention is described in more detail by EXAMPLES, which by no means limit the present invention. Metals were analyzed by the following method in EXAMPLES.

(1) Analysis of Metals: Conducted by ICP Emission Spectrometry

Example 1

The leaching residue, obtained by chlorine leaching of a copper concentrate, was treated by the pyrolysis, re-leaching and sulfur distillation steps, to evaluate concentration of gold in each product.

First, the leaching residue was prepared by chlorine leaching of a copper concentrate. A 500 mL reactor of titanium was charged with 30 g of the copper concentrate (refer to Table 10 for its chemical composition) and 300 mL of an acidic, chloride-based leaching solution (copper concentration: 60 g/L, chloride ion concentration: 200 g/L), and put in an oil bath to keep the slurry at 105 to 110° C., into which a chlorine gas was blown for 3 hours for leaching at a constant oxidation-reduction potential of 520 mV (determined using a silver/silver chloride reference electrode). Then, the slurry was separated by filtration into the leaching residue and leaching liquor. The residue weighed 15 g. It was analyzed for the chemical composition. The results are given in Table 10.

The leaching residue put in a quartz boat was heated at 620° C. in a tubular furnace in a flow of nitrogen gas for 3 hours to pyrolyze pyrite. The resulting calcined ore was analyzed for the chemical composition. The results are given in Table 10. No fusion was observed in the calcined ore.

The calcined ore was re-leached under the same conditions as those for the above-described chlorine leaching in the acidic, chloride-based leaching solution. The resulting re-leaching residue was evaluated for the chemical composition. The results are given in Table 10.

The re-leaching residue was thermally treated at 320° C. in a tubular furnace in a flow of nitrogen gas for 3 hours. The residue treated to distill off elementary sulfur was analyzed for the chemical composition. The results are given in Table 10.

TABLE 10

|  | Chemical composition (% by weight) | | | | Content (g/t) |
| --- | --- | --- | --- | --- | --- |
|  | Cu | Fe | S | SiO$_2$ | Au |
| Copper concentrate | 29.2 | 23.5 | 29.6 | 9.7 | 16 |
| Chlorine leaching residue | 0.7 | 10.5 | 58.8 | 19.6 | 31 |
| Calcined ore | 1.5 | 21.2 | 15.1 | 42.5 | 63 |
| Re-leaching residue | <0.1 | 1.2 | 27.9 | 46.6 | 89 |
| Residue* | <0.1 | 1.9 | 2.1 | 65.4 | 110 |

*Re-leaching residue after treated by the sulfur distillation step

As shown in Table 10, EXAMPLE 1 concentrated gold from 16 g/t in the copper concentrate to 110 g/t in the sulfur distillation residue by a series of the treatment steps for the present invention. The residue was composed mostly of SiO$_2$, containing Fe and S only at a low content. Therefore, it is suitably treated by an existing dry smelting step to recover gold.

Example 2

The leaching residue, obtained by chlorine leaching of a copper concentrate, was treated by the pyrolysis, magnetic separation, re-leaching and sulfur distillation steps, to evaluate concentration of gold in each product.

First, the leaching residue was prepared by chlorine leaching of a copper concentrate. A 500 mL reactor of titanium was charged with 30 g of the copper concentrate (refer to Table 11 for its chemical composition) and 300 mL of an acidic, chloride-based leaching solution (copper concentration: 60 g/L, chloride ion concentration: 200 g/L), and put in an oil bath to keep the slurry at 105 to 110° C., into which a chlorine gas was blown for 3 hours for leaching at a constant oxidation-reduction potential of 520 mV (determined using a silver/silver chloride reference electrode). Then, the slurry was separated by filtration into the leaching residue and leaching liquor. The residue weighed 15 g. It was analyzed for the chemical composition. The results are given in Table 11.

The leaching residue put in a quartz boat was heated at 600° C. in a tubular furnace in a flow of nitrogen gas for 3.5 hours to pyrolyze pyrite. The resulting calcined ore was analyzed for the chemical composition. The results are given in Table 11. No fusion was observed in the calcined ore.

The calcined ore was separated by the magnetic separation step into the magnetic and non-magnetic fractions. Each fraction was analyzed for the chemical composition. The results are given in Table 11.

The magnetic fraction was re-leached under the same conditions as those for the above-described chlorine leaching in the acidic, chloride-based leaching solution. The resulting re-leaching residue was evaluated for the chemical composition. The results are given in Table 11.

The re-leaching residue was thermally treated at 320° C. in a tubular furnace in a flow of nitrogen gas for 3 hours. The residue treated to distill off elementary sulfur was analyzed for the chemical composition. The results are given in Table 11.

TABLE 11

| | Chemical composition (% by weight) | | | | Content (g/t) |
|---|---|---|---|---|---|
| | Cu | Fe | S | SiO$_2$ | Au |
| Copper concentrate | 27.9 | 26.0 | 30.5 | 5.1 | 9 |
| Chlorine leaching residue | 0.7 | 9.9 | 53.3 | 21.9 | 30 |
| Calcined ore | 1.4 | 20.4 | 14.0 | 39.2 | 70 |
| Magnetic fraction | 1.4 | 53.5 | 35.3 | 6.4 | 73 |
| Non-magnetic fraction | 1.5 | 2.6 | 2.3 | 63.5 | 68 |
| Re-leaching residue | 0.6 | 1.5 | 61.1 | 11.1 | 141 |
| Residue* | 1.0 | 2.4 | 4.6 | 29.0 | 233 |

*Re-leaching residue after treated by the sulfur distillation step

As shown in Table 11, EXAMPLE 2 concentrated gold from 9 g/t in the copper concentrate to 233 g/t in the sulfur distillation residue by a series of the treatment steps for the present invention. The residue was composed mostly of SiO$_2$, containing Fe and S only at a low content. Therefore, it is suitably treated by an existing dry smelting step to recover gold.

As discussed above, the method of the present invention for concentrating precious metals contained in the leaching residue discharged from a copper hydrometallurgical process concentrates precious metals in the residue by removing pyrite from the residue, and has very high industrial values.

What is claimed is:

1. A method for concentrating precious metals in a leaching residue containing pyrite, elementary sulfur, precious metals and gangue, discharged from a copper hydrometallurgical process, said method comprising:
   (1) providing the leaching residue produced from leaching a copper sulfide ore in an acidic, aqueous, chlorine-based solution,
   (2) a pyrolysis step in which the leaching residue is thermally treated at 550° C. or higher in a non-oxidative atmosphere, to produce a calcined ore containing pyrrhotite, precious metals and gangue, and
   (3) a re-leaching step in which the calcined ore is re-leached in an acidic, aqueous solution, to be separated into a re-leaching residue and iron-leached liquor, the former containing elementary sulfur, precious metals and gangue,
   wherein the acidic, aqueous solution for the re-leaching step is a copper-containing leaching liquor discharged from a leaching step of leaching a copper sulfide ore with an acidic, aqueous, chloride-based solution in the copper hydrometallurgical process.

2. The method according to claim 1 for concentrating precious metals, wherein the leaching residue to be treated by the pyrolysis step contains silicic acid at 5% by weight or more.

3. The method according to claim 1 for concentrating precious metals, wherein the acidic, aqueous solution for the re-leaching step is adjusted beforehand at an oxidation-reduction potential of 600 mV or less, determined using a silver/silver chloride reference electrode.

4. The method according to claim 1 for concentrating precious metals, wherein the leaching residue discharged from the re-leaching step is distilled at 200 to 350° C. to distill off the elementary sulfur.

5. The method according to claim 1 for concentrating precious metals, wherein a sulfur-distillation step for treating the leaching residue at 150 to 500° C. is incorporated prior to the pyrolysis step to distill off the elementary sulfur beforehand.

6. A method for concentrating precious metals in a leaching residue containing pyrite, elementary sulfur, precious metals and gangue, discharged from a copper hydrometallurgical process, said method comprising:
   (1) providing the leaching residue produced from leaching a copper sulfide ore in an acidic, aqueous, chlorine-based solution,
   (2) a pyrolysis step in which the leaching residue is thermally treated at 550 to 750° C. in a non-oxidative atmosphere, to produce a calcined ore containing pyrrhotite, precious metals and gangue,
   (3) a magnetic separation step in which the calcined ore is separated into a non-magnetic fraction and a magnetic fraction, the former containing precious metals and gangue and the latter containing pyrrhotite and precious metals, and
   (4) a re-leaching step in which the magnetic fraction is re-leached in an acidic, aqueous solution, to be separated into the re-leaching residue and iron-leached liquor, the former containing elementary sulfur, precious metals and gangue,
   wherein the acidic, agueous solution for the re-leaching step is a copper-containing leaching liquor discharged from a leaching step of leaching a copper sulfide ore with an acidic, agueous, chloride-based solution in the copper hydrometallurgical process.

7. The method according to claim 6 for concentrating precious metals, wherein the leaching residue to be treated by the pyrolysis step contains silicic acid at 5% by weight or more.

8. The method according to claim 6 for concentrating precious metals, wherein the acidic, aqueous solution for the re-leaching step is adjusted beforehand at an oxidation-reduction potential of 600 mV or less, determined using a silver/silver chloride reference electrode.

9. The method according to claim 6 for concentrating precious metals, wherein the leaching residue discharged from the re-leaching step is distilled at 200 to 350° C. to distill off the elementary sulfur.

10. The method according to claim 6 for concentrating precious metals, wherein a sulfur-distillation step for treating the leaching residue at 150 to 500° C. is incorporated prior to the pyrolysis step to distill off the elementary sulfur beforehand.

11. The method according to claim 10 for concentrating precious metals, wherein the re-leaching residue discharged from the re-leaching step is recycled back to the sulfur-distillation step.

* * * * *